(12) United States Patent
Hatton et al.

(10) Patent No.: US 8,302,901 B2
(45) Date of Patent: Nov. 6, 2012

(54) CRAFT HAVING A ROTATABLE FLUID PROPULSION DEVICE

(75) Inventors: Geoffrey Hatton, Cambridgeshire (GB); Simon McIntosh, Cambridgeshire (GB)

(73) Assignee: GFS Projects Limited, Cambridgeshire (GB)

( * ) Notice: Subject to any disclaimer, the term of this patent is extended or adjusted under 35 U.S.C. 154(b) by 1101 days.

(21) Appl. No.: 11/909,507

(22) PCT Filed: Mar. 23, 2006

(86) PCT No.: PCT/GB2006/050066
§ 371 (c)(1),
(2), (4) Date: Jul. 25, 2008

(87) PCT Pub. No.: WO2006/100525
PCT Pub. Date: Sep. 28, 2006

(65) Prior Publication Data
US 2009/0242689 A1   Oct. 1, 2009

(30) Foreign Application Priority Data

Mar. 23, 2005 (GB) .................................. 0505958.9
May 3, 2005 (GB) .................................. 0508793.7

(51) Int. Cl.
*B64C 15/00* (2006.01)
(52) U.S. Cl. ..................................................... 244/12.2
(58) Field of Classification Search ........ 244/12.1–12.5, 244/23 C, 17.11
See application file for complete search history.

(56) References Cited

U.S. PATENT DOCUMENTS

| 1,104,542 | A |   | 7/1914  | Porter |
| 2,108,652 | A |   | 2/1938  | Coanda |
| 2,927,746 | A | * | 3/1960  | Mellen ......................... 244/12.2 |
| 2,944,762 | A | * | 7/1960  | Lane ............................. 244/12.2 |
| 2,978,206 | A |   | 4/1961  | Johnson |
| 2,997,254 | A | * | 8/1961  | Mulgrave et al. ............ 244/12.2 |
| 3,041,009 | A | * | 6/1962  | Wharton ...................... 244/12.2 |
| 3,067,967 | A | * | 12/1962 | Barr ............................. 244/12.2 |
| 3,224,711 | A |   | 12/1965 | Warren et al. |
| 3,276,723 | A |   | 10/1966 | Miller et al. |

(Continued)

FOREIGN PATENT DOCUMENTS

AT   370049   2/1983

(Continued)

OTHER PUBLICATIONS

Office Action for U.S. Appl. No. 11/909,500 dated May 21, 2010.

(Continued)

*Primary Examiner* — Tien Dinh
(74) *Attorney, Agent, or Firm* — Martin Fleit; Paul D. Bianco; Fleit Gibbons Gutman Bongini & Bianco PL

(57) ABSTRACT

The invention arose in the design of vertical takeoff craft where a bladed rotor directs a jet of fluid over a curved surface so that the jet is turned from a radial direction towards an axial direction to create lift. These craft have stability problems when an attempt is made to hover close to the ground or to a vertical surface and for this reason such craft have been confined to paper proposals and unsuccessful experimental models. In accordance with the invention, the craft is designed so that its rotor and other moving parts have a large angular momentum. In this way, a gyroscopic effect is achieved, sufficient to give positive stability to the craft, eliminating the aforementioned problem.

17 Claims, 5 Drawing Sheets

U.S. PATENT DOCUMENTS

| | | | | |
|---|---|---|---|---|
| 3,405,889 A | * | 10/1968 | Wagle | 244/12.2 |
| 3,489,374 A | * | 1/1970 | Morcom | 244/12.2 |
| 3,697,020 A | | 10/1972 | Thompson | |
| 3,747,726 A | | 7/1973 | Walter | |
| 3,997,131 A | * | 12/1976 | Kling | 244/23 R |
| 4,516,747 A | | 5/1985 | Lurz | |
| 4,674,708 A | | 6/1987 | Del Castillo | |
| 5,031,859 A | | 7/1991 | Cunningham | |
| 5,054,713 A | | 10/1991 | Langley et al. | |
| 5,170,963 A | | 12/1992 | Beck | |
| 5,203,521 A | * | 4/1993 | Day | 244/12.2 |
| 5,503,351 A | | 4/1996 | Vass | |
| 5,803,199 A | * | 9/1998 | Walter | 180/120 |
| 6,044,706 A | * | 4/2000 | Roh | 73/504.12 |
| 6,050,520 A | * | 4/2000 | Kirla | 244/23 A |
| 6,082,478 A | | 7/2000 | Walter et al. | |
| 6,234,751 B1 | | 5/2001 | Hassan et al. | |
| 6,270,036 B1 | | 8/2001 | Lowe, Jr. | |
| 6,412,732 B1 | | 7/2002 | Amitay et al. | |
| 6,450,446 B1 | | 9/2002 | Holben | |
| 6,457,654 B1 | | 10/2002 | Glezer | |
| 2004/0129831 A1 | | 7/2004 | Dunagin, Jr. | |
| 2004/0164203 A1 | | 8/2004 | Billiu | |
| 2008/0191101 A1 | | 8/2008 | Hatton | |
| 2008/0213090 A1 | | 9/2008 | Hatton | |
| 2008/0223979 A1 | | 9/2008 | Schlunke | |
| 2009/0065649 A1 | | 3/2009 | Babinsky | |
| 2009/0242689 A1 | | 10/2009 | Hatton | |

FOREIGN PATENT DOCUMENTS

| | | |
|---|---|---|
| DE | 299 14 928 U1 | 3/2001 |
| GB | 942856 | 12/1961 |
| GB | 915515 | 1/1963 |
| GB | 2387158 A | 8/2003 |
| GB | 2387158 A | 10/2003 |
| WO | WO 02/070342 A1 | 9/2002 |
| WO | WO2006/100523 | 9/2006 |
| WO | WO2006/100524 | 9/2006 |
| WO | WO2006/100525 | 9/2006 |
| WO | WO2006/100526 | 9/2006 |

OTHER PUBLICATIONS

International Preliminary Report on Patentability PCT/GB2006/050066.

Written Opinion of the International Search Authority PCT/GB2006/050066.

International Search Report PCT/GB2006/050066.

Oxford Dictionaries Online, definition of Oblate retrieved from Internet on Jul. 12, 2010.

Gregory-Smith D.G. et al, The Discharge from a Thin Slot Over a Surface of Convex Curvature, Int. J. Mech. Sci. vol. 24, No. 6, pp. 329-339, 1982.

Notice of Allowance for U.S. Appl. No. 11/909,524 mailed Aug. 20, 2010.

D. G. Gregory-Smith and C.J. Robinson, The Discharge from a Thin Slot Over a Surface of Convex Curvature, pp. 329-339, 1982, Int. J. Mech. Sci, vol. 24, No. 6, Pergamon Press Ltd.

International Search Report published Nov. 23, 2006 for PCT/GB2006/050067 filed Mar. 23, 2006.

International Preliminary Report on Patentability published Sep. 25, 2007 for PCT/GB2006/050067 filed Mar. 23, 2006.

Written Opinion of the International Searching Authority Published Sep. 23, 2007 for PCT/GB2006/050067 filed Mar. 23, 2006.

International Search Report published Dec. 21, 2006 for PCT/GB2006/050066 filed Mar. 23, 2006.

International Preliminary Report on Patentability published Sep. 25, 2007 for PCT/GB2006/050066 filed Mar. 23, 2006.

Written Opinion of the International Searching Authority Published Sep. 23, 2007 for PCT/GB2006/050066 filed Mar. 23, 2006.

International Search Report published Sep. 28, 2006 for PCT/GB2006/050064 filed Mar. 23, 2006.

International Preliminary Report on Patentability published Sep. 25, 2007 for PCT/GB2006/050064 filed Mar. 23, 2006.

Written Opinion of the International Searching Authority Published Sep. 23, 2007 for PCT/GB2006/050064 filed Mar. 23, 2006.

International Search Report published Sep. 28, 2006 for PCT/GB2006/050065 filed Mar. 23, 2006.

International Preliminary Report on Patentability published Sep. 25, 2007 for PCT/GB2006/050065 filed Mar. 23, 2006.

Written Opinion of the International Searching Authority Published Sep. 23, 2007 for PCT/GB2006/050065 filed Mar. 23, 2006.

Office Action dated Apr. 15, 2010 issued in U.S. Appl. No. 11/909,524, filed Sep. 24, 2007.

Office Action mailed Jun. 10, 2009 for U.S. Appl. No. 11/909,515, filed Sep. 24, 2007, published Mar. 12, 2009 under publication No. 2009/0065649.

* cited by examiner

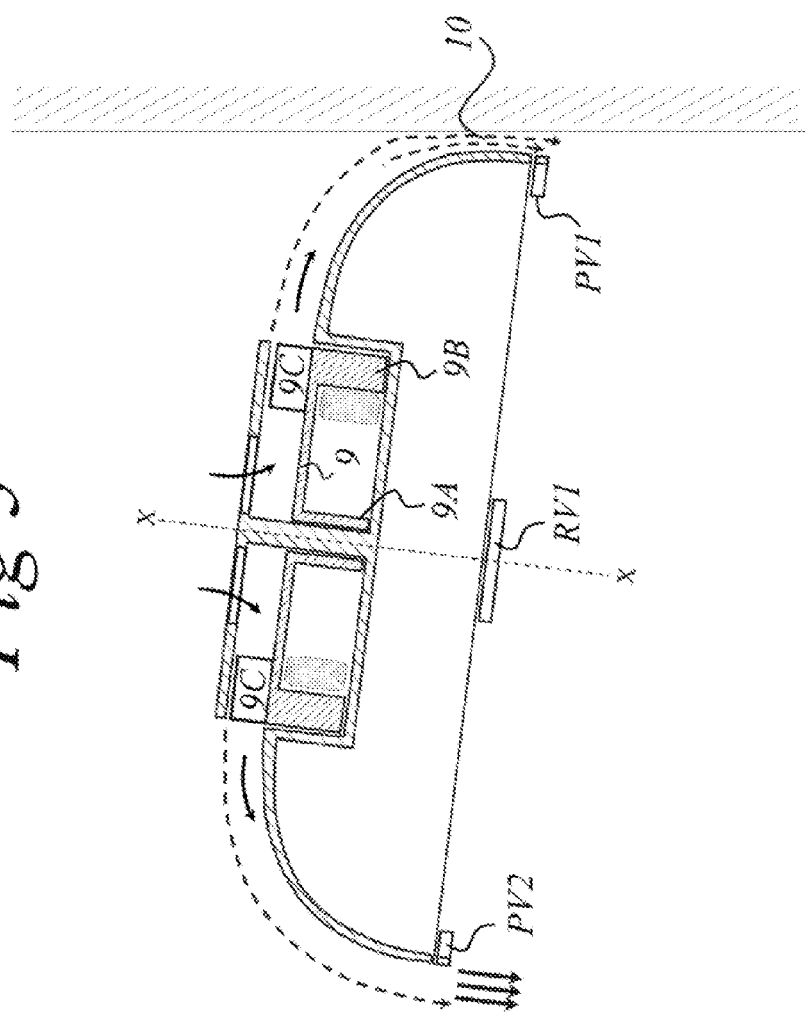

CRAFT HAVING A ROTATABLE FLUID PROPULSION DEVICE

FIELD OF THE INVENTION

This invention relates to a craft in which a rotor directs a jet of fluid over an aerodynamic surface to create lift or thrust.

BACKGROUND OF THE INVENTION

The invention is potentially applicable to any such craft, for example a fixed wing propeller-driven aircraft, a propeller-driven submarine or water surface craft, However, the invention arose in connection with the design of a particular type of vertical take-off aircraft where a bladed rotor is used to direct a jet of air over a curved surface so that the jet is turned from a radial direction towards an axial direction thereby creating the required lift or thrust.

Stability is a particularly acute problem in craft such as helicopters which are required to hover. Complex control systems are normally needed to achieve the required degree of stability. For craft of the particular type referred to above, no satisfactory stabilising system has yet been devised and, probably for that reason, such craft have at least mainly been confined to paper proposals and unsuccessful experimental models.

SUMMARY OF THE INVENTION

The invention provides a craft in which a rotor directs a jet of fluid over an aerodynamic surface there by creating lift or thrust, characterised in that the rotor and an associated drive unit are such that, in operation at full power, a gyroscopic effect of the rotor gives the vehicle positive stability. The term "positive stability" is defined in the definitions section of this specification.

Conventional practice, when designing aircraft, has placed great emphasis on a reduction, so far as possible, of the weight of all components of the aircraft so as to minimize the lifting force needed to support the weight of the craft itself. This invention arose from a realisation that a critically important advantage can be achieved by distributing the weight in such a way as to maximise the angular momentum of the rotating parts. This can increase their gyroscopic effect to a degree such that the craft is given positive stability (as hereinafter defined). This can be achieved by designing the craft so that the rotor carries (or is formed integrally with) as much of the weight of the craft as possible, such weight being located as far as is reasonably possible from an axis of rotation. Naturally, the angular velocity of the rotor has an influence on the angular momentum and therefore, to achieve the requirements of the invention, the power, speed and gearing (if any) of the drive unit and any associated power supply will have to be chosen correctly in association with the moment of inertia of the rotating parts.

The invention is particularly applicable to a craft of the type in which the rotor directs the jet of air over a dome or canopy shaped to divert the jet from a radial or horizontal direction towards an axial or vertical direction, thereby providing lift. The inventor has discovered that such craft are highly susceptible to certain stability problems.

The first of these problem situations arises during lift-off and landing because the integrity of the jet of air, as it separates from a lower edge of the canopy, is spoilt by the presence of the ground surface. If one side of the lower edge of the canopy is lifted from the ground higher than an opposite side (eg by a gust of wind), that first-mentioned side experiences greater lift because the effect of the ground surface there is reduced. Consequently, the vehicle becomes unstable. The positive stability obtained by employing the invention has been found to be capable of controlling the aforementioned problem. Further benefit can be obtained by raising a bottom edge of the canopy from the ground surface using legs or equivalent spacing means thereby reducing the detrimental effect of the ground on lift.

A second stability problem arises when the craft is required to fly close to a vertical surface. In a manner analogous to the situation previously described on take-off, when one side of the craft approaches a vertical surface, the jet flow on that side is disturbed, causing reduced lift on that side. Consequently the craft tends to tilt towards the vertical surface, eventually touching it, losing overall lift and dropping to the ground. Expressed another way, as the craft approaches the vertical surface, an above-ambient pressure is produced at the wall surface which translates to an increased static pressure at the canopy surface. This produces a controlled moment towards the wall which tilts the thrust vector, driving the craft closer still to the wall as if it were attracted to it.

It has been found that, by employing the invention, it becomes possible also to deal with this second problem. Because of the gyroscopic action of the rotating parts, the forces tending to tip the craft towards the vertical surface are translated into a precessional movement around a vertical axis, causing the craft to move sideways parallel to the vertical surface but without crashing into it.

The craft is preferably controlled using two angular movement or attitude sensors, typically optical or piezoelectric gyroscopes, set at an angle to each other to sense pitch and roll about orthogonal axes. These sensors are used to control respective pitch and roll controls such as vanes positioned on the lower edge of the canopy. Initial experiments showed that a control system constructed in this way did not function correctly. The inventor realised that when the control system attempted to apply turning moments about the same axes as those about which pitch and roll is measured, the gyroscopic effect of the rotor translated those moments through an angle equal to the gyroscopic angle of precession. He conjectured that this problem would be solved if the axes about which rotation is sensed were displaced, by a variable angle equal to the precession angle, from the axes about which control forces are applied. The displacement needs to be variable because the precession angle varies with angular velocity.

The aforementioned angular displacement is easily achieved by varying the axes about which pitch and roll are measured either by physically moving the sensors or by processing signals received from fixed sensors. An alternative technique would be to adjust the angles about which turning moments are applied; or a combination of both techniques could be used.

The aforementioned technique of correcting for the gyroscopic effect of the rotor, when calculating the direction of the force required to correct the attitude of the craft or to steer it in a required direction is considered to be entirely novel and thus, according to a second aspect of this invention there is provided a craft comprising a rotor, means for sensing a difference between a desired attitude and an actual attitude of the craft, and control means for determining a force required to reduce the said difference; characterised by means for producing a variable signal dependant on angular momentum of the rotor and in that the control means is designed to use the said variable signal to correct for a gyroscopic effect of the rotor.

One example of how the invention can be implemented will now be described by way of example with reference to the accompanying drawings in which:

BRIEF DESCRIPTION OF THE DRAWINGS

FIG. 5 is similar to FIG. 2 but shows how the craft would tilt when approaching a vertical wall, were it not for a gyroscopic effect of the invention.

DETAILED DESCRIPTION OF THE INVENTION

Figure 1:
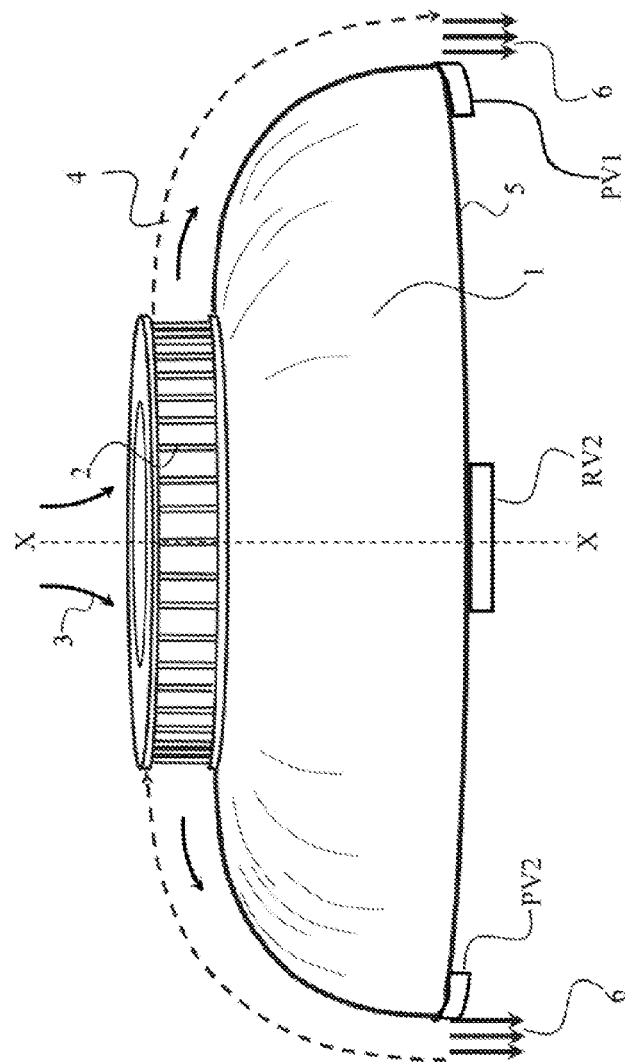
FIG. 1 is a schematic perspective view of a craft constructed in accordance with the invention.

Referring first to FIG. 1, the illustrated craft comprises a dome-shaped canopy 1 having a vertical axis of symmetry X-X. A radial fan 2 draws in air at 3 along the axis X-X and expels it as a radial jet 4 over the surface of the canopy. The latter has the effect of diverting a jet stream from a radial direction to an axial direction so that it eventually separates from a lower edge 5 of the canopy as an annular stream 6. The action of the canopy in diverting the jet from a radial to an axial direction produces an upward force on the craft, giving it sufficient lift to support its own weight plus any payload.

Mounted on the lower edge 5 of the canopy are vanes RV1 and RV2 (only one visible in FIG. 1) which are used to control roll of the craft, and vanes PV1, PV2 which control pitch.

Figure 2:
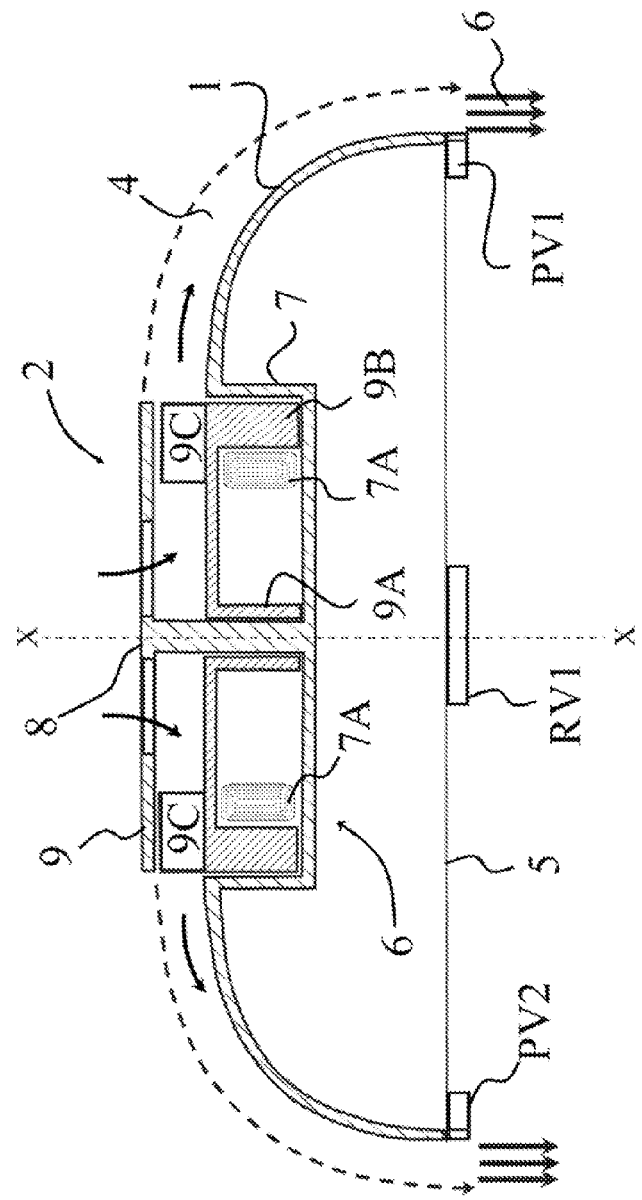
FIG. 2 is a vertical axial cross-section through the craft of FIG. 1.

Referring to FIG. 2, it can be seen that the radial fan 2 and an associated drive mechanism are located in a recess 7 at the top of the canopy 1. An axial shaft 8 carries an upper plate 8A having apertures to define an air intake. The recess 7 receives fixed coils 7A and a rotor 9. The rotor 9 has a boss 9A. mounted for rotation on the shaft 8 and a heavy annular ring 9B. The ring 9B defines a permanent magnet and co-operates with the coils 8 to form an electric motor driven, in this particular example, by batteries and an associated drive circuit (not shown). An upper side of the rotor 9 carries radial fan blades SC positioned at a level so as to impel air over the top of the surface of the canopy.

The rotor 9 is designed to have a large angular inertia about its axis X-X by virtue of the weight of the magnet 9B and the blades 9C at the radially outermost periphery of the rotor. The use of a radial fan for impelling the air is particularly effective because radial fans are efficient at producing radial flow and naturally tend to have a high distribution of weight away from the axis of rotation, giving them a high angular inertia. In accordance with the invention, the angular inertia of the rotor and the design of the motor and power supply are such that, at maximum power, the craft has positive stability.

Figure 3:
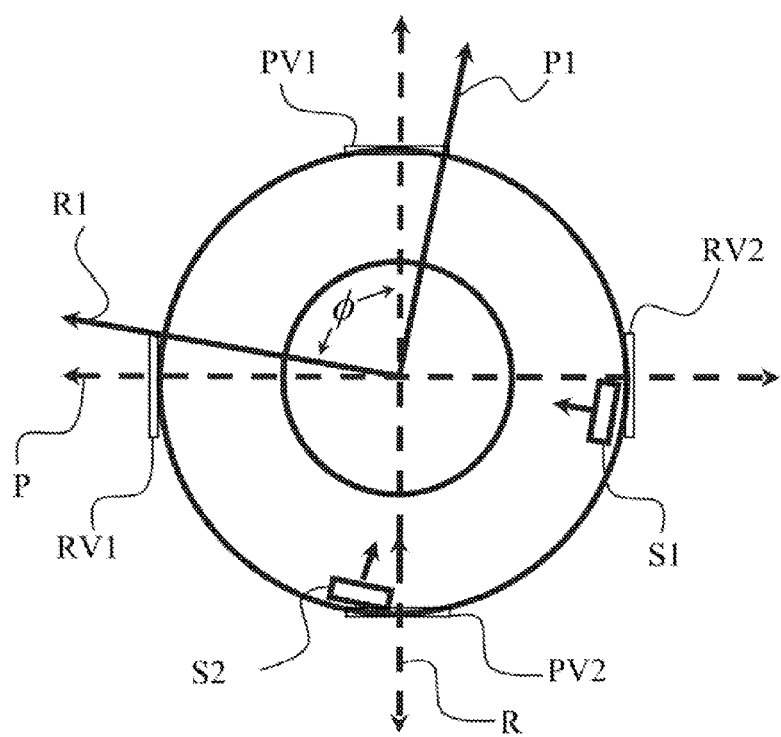
FIG. 3 is a schematic diagram showing the craft from above.

FIG. 3 shows an axis P, rotation about which is considered, for the purposes of this description, to be "pitch" and an orthogonal vertical axis R, rotation about which is considered to be "roll." The precession angle of the gyroscopic system is a variable ∅ which depends on the angular velocity of the motor. The gyroscopic effect means that an attempt to apply a turning force in one plane results in a reaction in another plane displaced from it by the angle ∅.

The craft is equipped with two optical gyroscopes S1 and S2 set to sense rotation about orthogonal axes. If the sensor S1 indicates an unwanted turning about an axis R1, this is corrected by adjusting vanes RV1, RV2 to apply a turning moment about axis R which is translated by the gyroscopic effect into an appropriate correctional force about axis R1. Likewise, if the sensor S2 indicates an unwanted turning moment about axis P1, this is corrected by adjusting vanes PV1, PV2. To allow for variations in angle ∅ with changing motor speed the sensors S1, S2 can be physically rotated by an appropriate amount related to the motor speed or their outputs can be processed electronically to achieve an equivalent effect.

Figure 4:
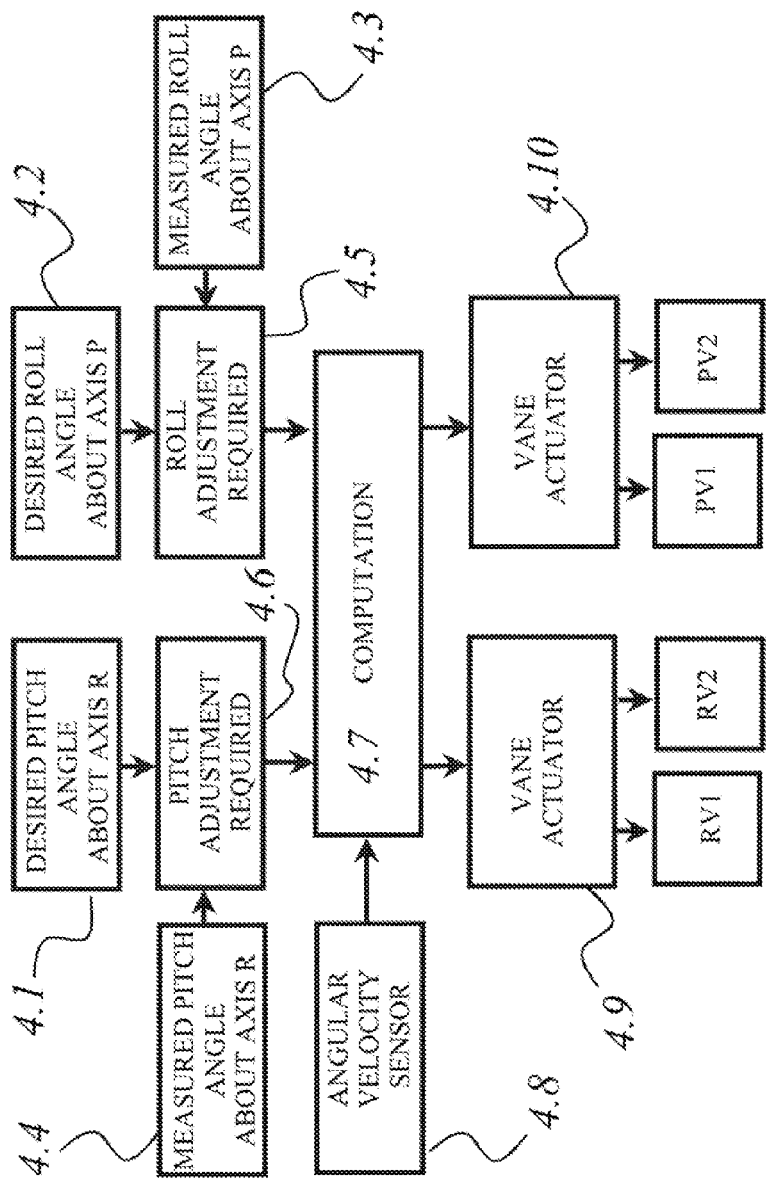
FIG. 4 is a block diagram of a control system of the craft.

A system for electronic processing is shown in FIG. 4 where blocks 4.1 and 4.2 indicate steering controls which generate signals defining desired pitch angle about axis P and roll angle about axis R. Measured values for these quantities, derived at 4.3 and 4.4 from. combined outputs of gyros S1 and S2 (FIG. 3), are compared at 4.5, 4.6 with the desired values to give error signals which are fed to a processor 4.7. The processor 4.7 also receives a signal from block 4.8 indicating the current angular velocity of the motor and uses this, together with a known value for the angular inertia of the system, to calculate the vane adjustments required to obtain the desired pitch and roll angles as defined at 4.1 and 4.2. The results of such calculation are used by signal generators 4.9 and 4.10 to produce appropriate drive signals for actuators associated with vanes RV1, RV2, and PV1, PV2.

Referring now to FIG. 5, the craft is shown approaching a vertical wall. it can be seen that, in a region 10 between the craft and the wall, the jet stream is disturbed. This results in loss of lift and consequently the axis X-X tends to pitch as shown, further exacerbating the problem. However it has been found that the strong gyroscopic action of the rotor 9 translates the pitching effect into a precessional movement which drives the vehicle laterally, parallel to the vertical surface and entirely avoiding collision of the vehicle with the surface.

A similar advantageous effect occurs during lift-off and landing. At these times, stability of the craft is threatened by the fact that any tilting of the axis x-x from the vertical will cause one part of the lower edge 5 of the canopy to be closer to the ground than other parts. The jet stream will therefore be disturbed by the ground surface more acutely at that side of the craft, this resulting in reduced lift at that part and an accentuation of the initial tilt. The positive stability, provided by the gyroscopic effect of the invention, eliminates this problem, allowing stable take-off and landing to take place.

Definitions

In this specifications the following definitions of terms apply

"Lift" and "thrust" are used synonymously in this specification to refer to a thrust vector in any desired direction.

"Aerodynamic" is used to refer to the generation of any thrust by the action of any fluid passing over a surface or of a surface passing through any fluid.

"Positive stability" is defined as a state in which a body, when displaced from a datum position, will, in response to such displacement, tend to return to that position.

"Axial" and "radial" refer to directions having respective axial and radial components.

"Craft" means any vehicle capable of moving through a fluid or on a surface or interface including air vehicles, water surface vehicles and submarines.

The invention claimed is:

1. A craft comprising:
    a dome shaped canopy forming a radial upper portion and an axial lower portion;
    a radial fan having blades;
    a rotor connected to the canopy and the fan, the blades positioned proximate the periphery of the rotor, the rotor configured to rotate the fan to direct a jet of fluid over the canopy, the canopy further shaped to divert the jet from the radial upper portion towards the axial lower portion to thereby provide lift or thrust; and at least one magnetic member positioned about the periphery of the rotor to thereby maximize an angular inertia of a motor formed to include the rotor and magnetic member, to increase a gyroscopic effect of the motor and fan;

wherein when the rotor is rotated to provide lift or thrust, an angular momentum is created to place the craft in a state of positive pitch and roll stability.

2. The craft according to claim 1, further comprising a control system for steering the craft wherein when the motor is in operation at full power, the gyroscopic effect gives a sufficient precession angle to allow the control system to maintain control however close the craft approaches an upwardly extending surface.

3. The craft according to claim 1, wherein a lower edge of the dome or canopy is raised above a ground surface when the craft is resting on flat ground.

4. The craft according to claim 1, further comprising means for sensing pitch and roll about orthogonal axes.

5. The craft according to claim 4, further comprising a controller for manipulating the pitch and roll.

6. The craft according to claim 5, further comprising a plurality of vanes for changing a precession angle of the craft.

7. The craft according to claim 1, further comprising a sensor configured to sense a difference between a desired attitude and an actual attitude of the craft, an electronic control system for determining a force required to reduce the difference, and means for producing a variable signal dependent on angular momentum of the rotor, wherein the control system is designed to use the variable signal to correct for the gyroscopic effect of the rotor.

8. An aircraft, comprising:

a dome shaped canopy forming a radial upper portion and an axial lower portion;

a radial fan having blades;

a rotor connected to the canopy and the fan, the blades positioned proximate the periphery of the rotor, the rotor configured to rotate the fan to direct a jet of fluid over the canopy, the canopy further shaped to divert the jet from the radial upper portion towards the axial lower portion to thereby provide lift or thrust;

a ring of magnetically active material positioned about the periphery of the rotor to thereby form together with the rotor a portion of a direct drive electric motor having a maximized angular inertia and gyroscopic effect due to placement of the weight of the ring of magnetically active material distal from a rotational axis of the rotor; and a magnetically active material affixed to the canopy proximate the ring of magnetically active material and forming an additional portion of the electric motor;

wherein when the rotor is rotated to provide lift or thrust, an angular momentum is created to place the craft in a state of positive pitch and roll stability through the gyroscopic effect of the motor and fan.

9. The craft according to claim 8, wherein the ring of magnetically active material is a permanent magnet.

10. The craft according to claim 8, wherein the magnetically active material affixed to the canopy is an electric coil.

11. The craft according to claim 8, further including adjustable vanes positioned proximate a lower edge of the canopy.

12. The craft according to claim 11, wherein at least one adjustable vane is provided on the pitch axis and at least one adjustable vane is provided on the roll axis.

13. The craft according to claim 8, the canopy further comprising a recess for receiving the rotor.

14. The craft according to claim 8, further comprising at least two sensors configured to sense a rotation of the craft about two orthogonal axes oriented in the radial direction, wherein rotation about one radial axis is defined as pitch and rotation about the other radial axis is defined as roll.

15. The craft according to claim 14, wherein the sensors are gyroscopic sensors.

16. The craft according to claim 8, further comprising at least one sensor configured to sense angular velocity.

17. A system for maneuvering the craft according to claim 8 comprising:

an electronic processor configured to— determine a desired pitch angle and a desired roll angle;

compare the desired pitch angle with the present pitch angle of the craft, the desired roll angle with the present roll angle of the craft, and the desired angular velocity with the present angular velocity of the rotor;

calculate adjustments to the vanes needed to produce the desired pitch angle and the desired roll angle; and cause to transmit a drive signal to an actuator associated with a vane to be adjusted.

* * * * *